(12) United States Patent
Routh et al.

(10) Patent No.: US 12,503,868 B2
(45) Date of Patent: Dec. 23, 2025

(54) WEDGE-CLIP CONNECTOR ASSEMBLY

(71) Applicant: PERI SE, Weissenhorn (DE)

(72) Inventors: Anibrata Routh, Mumbai (IN); Arun Kunnathally Somasundaram, Mumbai (IN); Sitarama Rao Naga Venkata Challa, Mumbai (IN); Mahesh Dongare, Mumbai (IN); Ankush Rathod, Mumbai (IN); Vinothkumar Raju, Mumbai (IN)

(73) Assignee: PERI SE, Weissenhorn (DE)

( * ) Notice: Subject to any disclaimer, the term of this patent is extended or adjusted under 35 U.S.C. 154(b) by 397 days.

(21) Appl. No.: 17/609,763

(22) PCT Filed: May 4, 2020

(86) PCT No.: PCT/EP2020/062323
§ 371 (c)(1),
(2) Date: Nov. 8, 2021

(87) PCT Pub. No.: WO2020/225216
PCT Pub. Date: Nov. 12, 2020

(65) Prior Publication Data
US 2022/0228383 A1 Jul. 21, 2022

(30) Foreign Application Priority Data
May 7, 2019 (IN) .............................. 201911018268

(51) Int. Cl.
*E04G 17/04* (2006.01)
*E04G 9/02* (2006.01)
(Continued)

(52) U.S. Cl.
CPC ............... *E04G 17/04* (2013.01); *E04G 9/02* (2013.01); *E04G 9/04* (2013.01); *E04G 11/08* (2013.01);
(Continued)

(58) Field of Classification Search
CPC ......... E04G 17/04; E04G 17/045; E04G 9/02; E04G 9/04; E04G 2009/028; E04G 11/08; F16B 5/06
See application file for complete search history.

(56) References Cited

U.S. PATENT DOCUMENTS 1,350,084 A * 8/1920 Schub .................. E04G 17/045
24/19
2,341,993 A * 2/1944 Jennings ........... E04G 2009/028
249/189
(Continued)

FOREIGN PATENT DOCUMENTS

CA 2179084 A1 * 12/1997 ............. E04G 17/04
CH 311730 A 12/1955
(Continued)

*Primary Examiner* — Matthew R McMahon
(74) *Attorney, Agent, or Firm* — SLEMAN & LUND LLP

(57) ABSTRACT

A connector assembly (400) for connecting a pair of formwork panels (200) with each other is disclosed. The connector assembly (400) includes a base component (402) having an arm, a first opening (602) formed on the arm, and a locking portion (406) formed at an end of the arm and adapted to be removably inserted in a second opening formed by alignment of respective slots (204) of the pair of formwork panels (200). The connector assembly (400) further includes a handle component (404) adapted to be partially disposed in the base component (402) through the first opening (602) formed on the arm. The handle component (404) is adapted to be operated to rotate the arm such that the locking portion (406) is rotated within the second opening (502) to partially lock the base component (402) in the second opening (502) for connecting the pair of formwork panels (200).

5 Claims, 7 Drawing Sheets

(51) Int. Cl.
  *E04G 9/04* (2006.01)
  *E04G 11/08* (2006.01)
  *F16B 5/06* (2006.01)
(52) U.S. Cl.
  CPC .............. *E04G 17/045* (2013.01); *F16B 5/06* (2013.01); *E04G 2009/028* (2013.01)

(56) References Cited

U.S. PATENT DOCUMENTS

| | | | |
|---|---|---|---|
| 3,550,898 A | 12/1970 | Ursini | |
| 3,712,576 A | 1/1973 | Dagiel | |
| 5,039,059 A * | 8/1991 | Miller | E04G 17/04 249/47 |
| 5,160,640 A | 11/1992 | Badstieber | |
| 5,174,909 A * | 12/1992 | Ward | E04G 17/04 249/47 |
| 5,562,845 A | 10/1996 | Miller | |
| 6,601,820 B2 * | 8/2003 | Gates | E04G 11/14 29/469 |
| 8,042,786 B2 * | 10/2011 | Spindler | E04G 17/045 292/57 |
| 2002/0100857 A1 * | 8/2002 | Gallis | E04G 17/0752 249/193 |
| 2004/0079860 A1 | 4/2004 | Ward | |
| 2006/0255236 A1 | 11/2006 | Shidler | |
| 2009/0146043 A1 * | 6/2009 | Gates | E04G 13/00 249/126 |
| 2016/0319558 A1 | 11/2016 | Lee | |

FOREIGN PATENT DOCUMENTS

| | | | |
|---|---|---|---|
| CN | 201037314 Y | 3/2008 | |
| CN | 201756793 U | 3/2011 | |
| CN | 202706551 U | 1/2013 | |
| CN | 106193584 A | 12/2016 | |
| CN | 208202569 U | 12/2018 | |
| DE | 3004395 A1 | 8/1981 | |
| DE | 3604252 A1 | 8/1987 | |
| DE | 202015006634 U1 | 11/2015 | |
| EP | 3144450 A1 | 3/2017 | |
| FR | 2429885 A1 * | 1/1980 | ............. E04G 17/04 |
| FR | 2484508 A1 * | 12/1981 | ........... E04G 17/045 |
| FR | 2607536 A1 | 6/1988 | |
| GB | 811383 A | 4/1959 | |
| GB | 930579 A * | 7/1963 | ........... E04G 17/045 |
| JP | H068601 U | 2/1994 | |
| JP | 2000009117 A | 1/2000 | |
| JP | 2004156281 A | 6/2004 | |
| JP | 2007154504 A | 6/2007 | |
| KR | 100860359 B1 | 9/2008 | |
| KR | 20080085676 A | 9/2008 | |
| KR | 20120067074 A | 6/2012 | |
| WO | 03052217 A1 | 6/2003 | |
| WO | 2003052217 A1 | 6/2003 | |
| WO | WO-2005042877 A1 * | 5/2005 | ........... E04G 13/026 |

* cited by examiner

WEDGE-CLIP CONNECTOR ASSEMBLY

FIELD OF THE INVENTION

The present disclosure relates to construction industry and more particularly, relates to a connector assembly adapted to connect a pair of formwork panels with each other.

BACKGROUND

In the construction industry, wall forms or panels are generally used as supporting components to form structures, such as columns and walls. Such panels are usually made of wood having a metal frame or made entirely of metal. Based on dimensions and shape of a structure to be formed, multiple panels are installed at a construction site to form a hollow space which would correspond to the dimensions and shape of the structure. In order to form the hollow space, the panels are basically connected to each other by using various connecting mechanisms, such as pins and latches. For example, in case of forming a column, multiple panels may be connected to each other to form a hollow space in between. Thereafter, concrete or any other material may be poured from the top in the hollow space, which would then settle in to take a targeted shape of the column, by the virtue of the dimensions of the hollow space. Over a period of time, the concrete dries out and the panels are then removed to obtain the column so formed.

In case of construction of larger structures, multiple panels are to be connected to each other. Any error in the connection of these panels may lead to falling of the panels causing damage at the construction site. The alignment of these panels with each other is equally critical and any error in the connection would directly hamper the alignment and consequently an overall quality of the structure to be formed.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In an embodiment of the present disclosure, a connector assembly for connecting a pair of formwork panels with each other is disclosed. The connector assembly includes a base component having an arm, a first opening formed on the arm, and a locking portion formed at an end of the arm. The locking portion is adapted to be removably inserted in a second opening formed by alignment of respective slots of the pair of formwork panels. The connector assembly further includes a handle component adapted to be partially disposed in the base component through the first opening formed on the arm. The handle component is adapted to be operated to rotate the arm such that the locking portion is rotated within the first opening to partially lock the base component in the first opening for connecting the pair of formwork panels.

In another embodiment of the present disclosure, a connector assembly for connecting a pair of formwork panels with each other is disclosed. The connector assembly includes a base component having an arm, a first opening formed on the arm, and a locking portion formed at an end of the arm. The locking portion is adapted to be removably inserted in a second opening formed by alignment of respective slots of the pair of formwork panels. The connector assembly further includes a handle component adapted to be partially disposed in the base component through the first opening formed on the arm. The handle component is adapted to be operated to rotate the arm such that the locking portion is rotated within the first opening to partially lock the base component in the first opening. The handle component is adapted to be further pushed downwards through the first opening such that the handle component comes in contact with a panel joint formed by the pair of formwork panels to completely lock the connector assembly with the pair of formwork panels.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
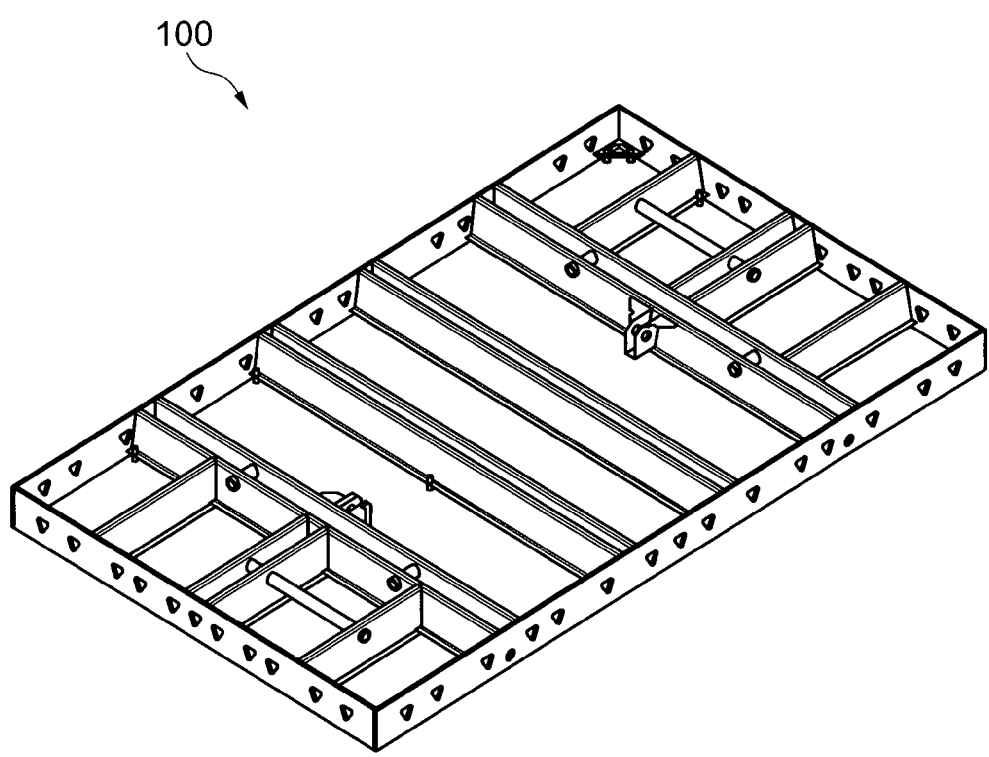
FIG. 1 illustrates a perspective view of a frame of a formwork panel, according to an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

For example, the term "some" as used herein may be understood as "none" or "one" or "more than one" or "all." Therefore, the terms "none," "one," "more than one," "more than one, but not all" or "all" would fall under the definition of "some." It should be appreciated by a person skilled in the art that the terminology and structure employed herein is for describing, teaching and illuminating some embodiments and their specific features and elements and therefore, should not be construed to limit, restrict or reduce the spirit and scope of the claims or their equivalents in any way.

For example, any terms used herein such as, "includes," "comprises," "has," "consists," and similar grammatical variants do not specify an exact limitation or restriction, and certainly do not exclude the possible addition of one or more features or elements, unless otherwise stated. Further, such terms must not be taken to exclude the possible removal of one or more of the listed features and elements, unless otherwise stated, for example, by using the limiting language including, but not limited to, "must comprise" or "needs to include."

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . . " or "one or more element is required."

Unless otherwise defined, all terms and especially any technical and/or scientific terms, used herein may be taken to have the same meaning as commonly understood by a person ordinarily skilled in the art.

Reference is made herein to some "embodiments." It should be understood that an embodiment is an example of a possible implementation of any features and/or elements presented in the attached claims. Some embodiments have been described for the purpose of explaining one or more of the potential ways in which the specific features and/or elements of the attached claims fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the attached claims. The attached claims and their legal equivalents can be realized in the context of embodiments other than the ones used as illustrative examples in the description below.

Embodiments of the present invention will be described below in detail with reference to the accompanying drawings.

Figure 2A:
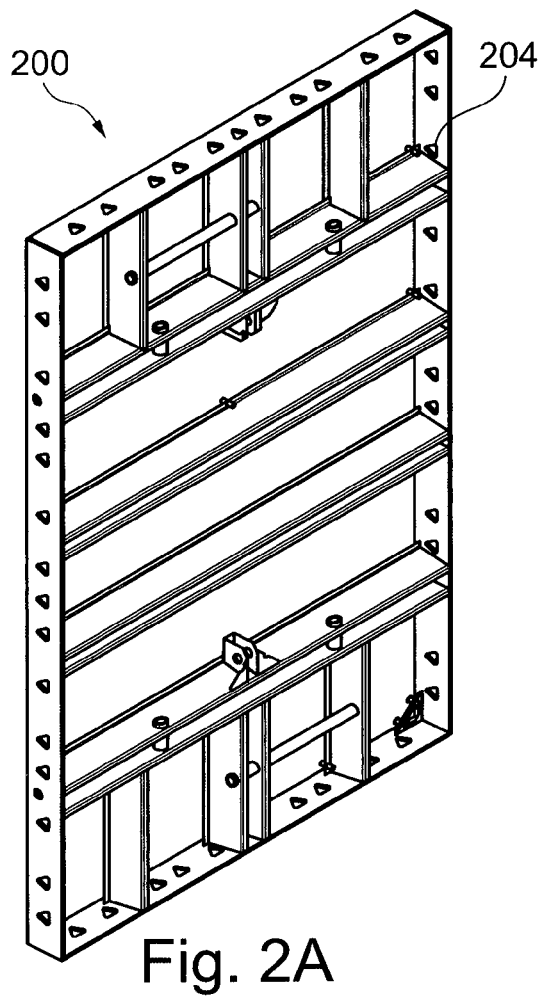
FIG. 2A illustrates a perspective back view of the formwork panel, according to an embodiment of the present disclosure.
Figure 2B:
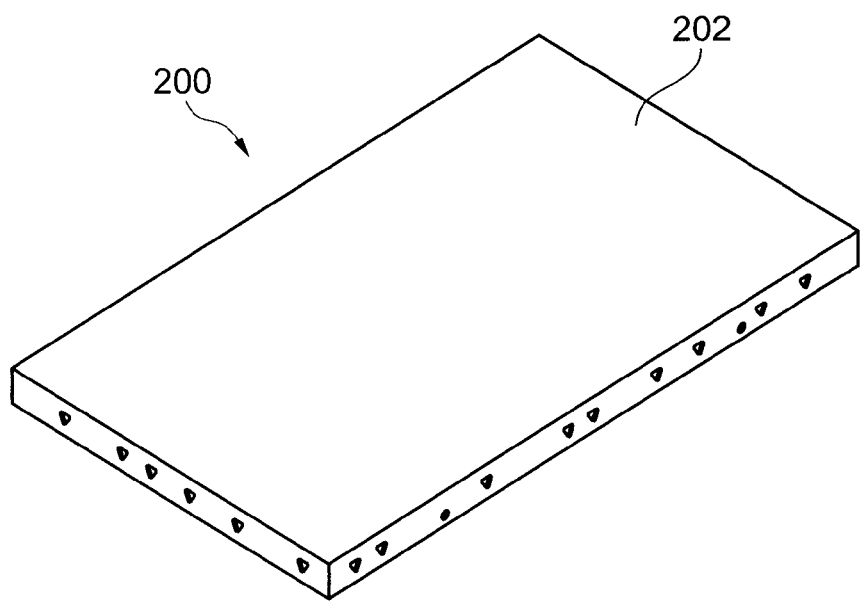
FIG. 2B illustrates a perspective front view of the formwork panel, according to an embodiment of the present disclosure.

FIG. 1 illustrates a perspective view of a frame 100 of a formwork panel, according to an embodiment of the present disclosure. For the ease of readability, the formwork panel may hereinafter be referred to as the panel. FIG. 2A illustrates a perspective back view of the panel 200, according to an embodiment of the present disclosure. FIG. 2B illustrates a perspective front view of the panel 200, according to an embodiment of the present disclosure. FIG. 2A and FIG. 2B may hereinafter collectively be referred to as FIG. 2. In order to avoid duplicity of information, FIG. 1 and FIG. 2 are explained in conjunction with each other. In an embodiment, the panel 200 may be adapted to be used for construction of structures, such as walls and columns.

Although the present disclosure is explained with respect to application of the panel 200 in the field of construction, the application of the panel 200 should not be construed to be limited to the construction industry only. In fact, the panel 200 can be used in any other application, without departing from the scope of the present disclosure.

In an embodiment, the panel 200 may include, but is not limited to, the frame 100 and a flat portion 202 fixed to the frame 100. The flat portion 202 may come in contact with concrete or any other variant during the construction of the structure. Therefore, the shape or profile of the flat portion 202 may depend on the profile of the structure to be formed. In an embodiment, the flat portion 202 may be formed of at least one of composite ply-board, Birch ply-board, a polypropylene board, and local ply-board. In an embodiment, the flat portion 202 may interchangeably be referred to as form-lining, without departing from the scope of the present disclosure. In an example, the flat portion 202 may have a thickness of 12-13 mm. Further, the flat portion 202 may be conveniently replaced at the construction site.

In an embodiment, the frame 100 may include a plurality of slots 204 for accommodating one or more connector assemblies. The slots 204 may be adapted to accommodate a connector assembly to form a connection between two adjoining panels 200. Constructional and operational details of the connector assembly are explained in detail in the description of subsequent Figures.

Figure 3B:
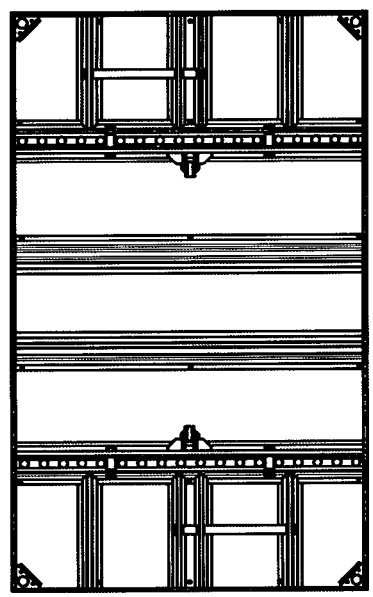
FIG. 3B illustrates a back view of the formwork panel, according to an embodiment of the present disclosure.
Figure 3A:
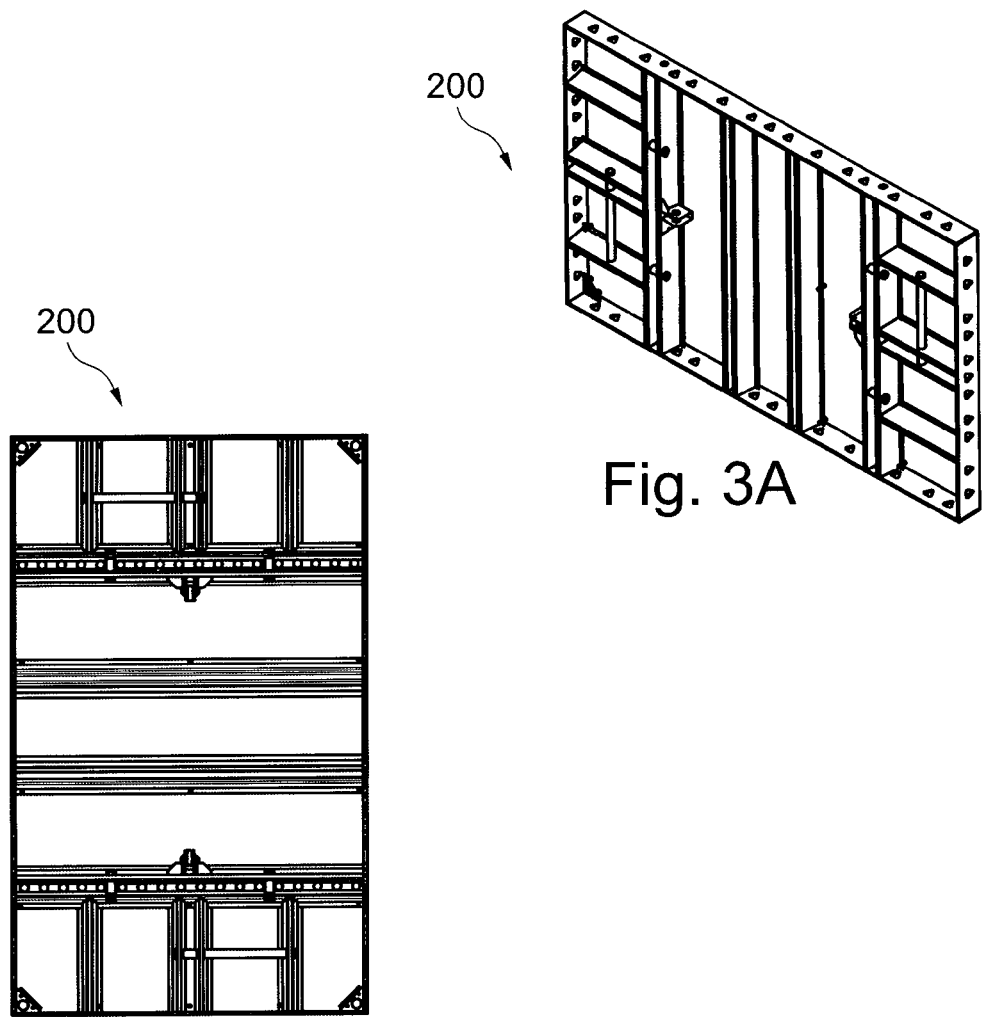
FIG. 3A illustrates another perspective back view of the formwork panel, according to an embodiment of the present disclosure.
Figure 3C:
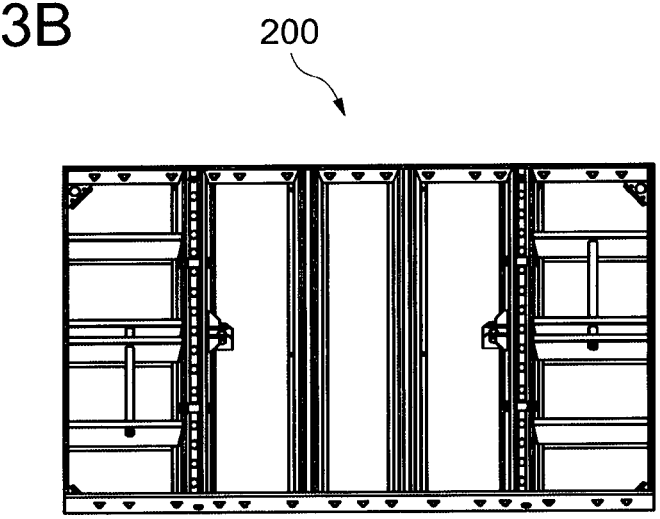
FIG. 3C illustrates another perspective back view of the formwork panel, according to an embodiment of the present disclosure.

FIG. 3A illustrates another perspective back view of the panel 200, according to an embodiment of the present disclosure. FIG. 3B illustrates a back view of the panel 200, according to an embodiment of the present disclosure. FIG. 3C illustrates another perspective back view of the panel 200, according to an embodiment of the present disclosure. FIG. 3A, FIG. 3B, and FIG. 3C may hereinafter collectively be referred to as FIG. 3.

Figure 4:
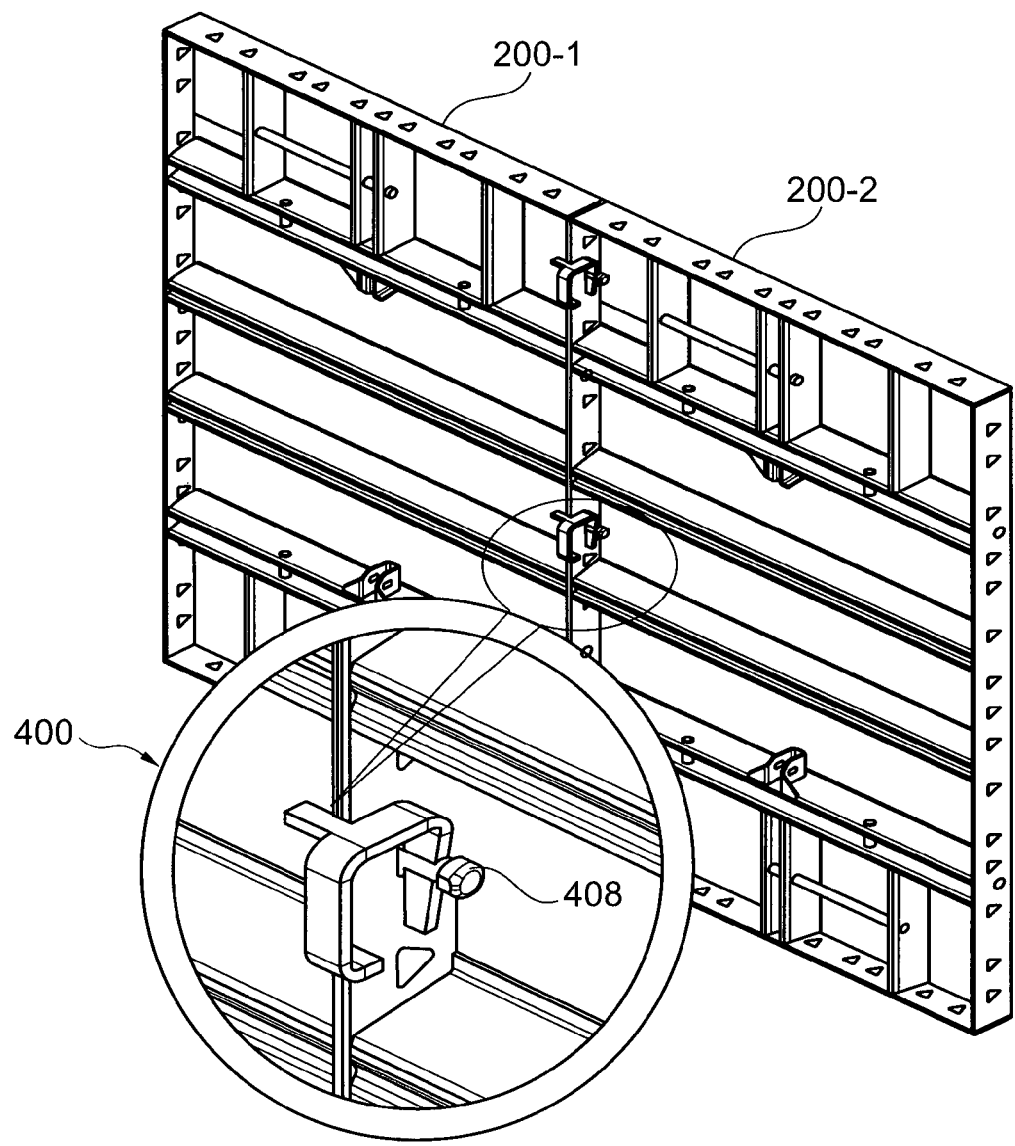
FIG. 4 illustrates a perspective view of a pair of formwork panels connected by a connector assembly mounted on the pair of formwork panels, according to an embodiment of the present disclosure.
Figure 5:
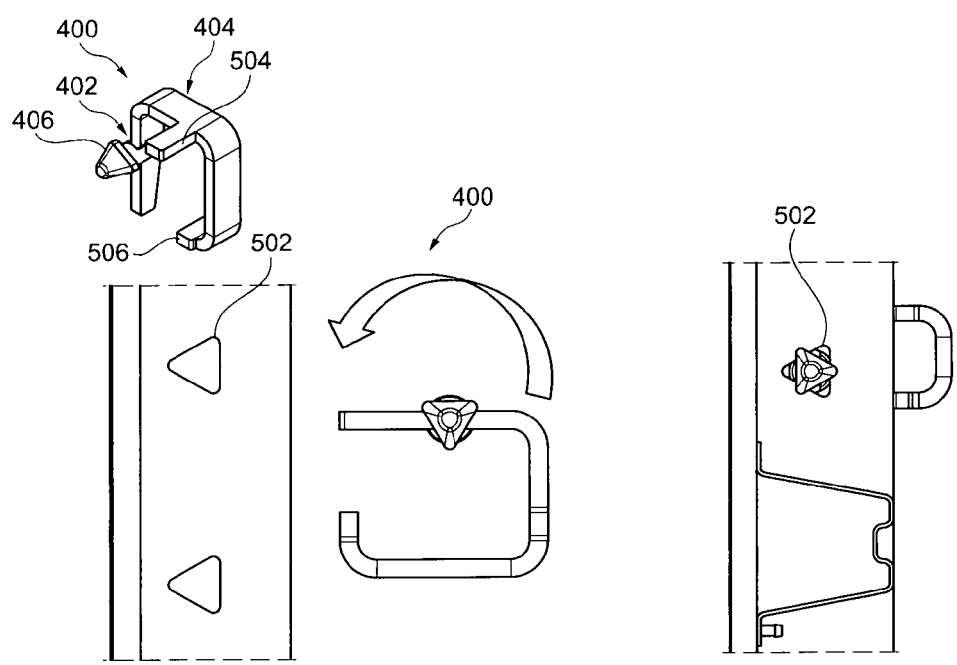
FIG. 5 illustrates a schematic view depicting installation of the connector assembly for connecting the pair of formwork panels, according to an embodiment of the present disclosure.

FIG. 4 illustrates a perspective view of a pair of panels 200-1 and 200-2 connected by the connector assembly 400, according to an embodiment of the present disclosure. In an embodiment, the connector assembly 400 may interchangeably be referred to as the wedge clip connector assembly 400, without departing from the scope of the present disclosure. The connector assembly 400 is adapted to connect and partially align the adjoining pair of panels 200 with each other. FIG. 5 illustrates a schematic view depicting installation of the connector. assembly 400 for connecting the pair of panels 200, according to an embodiment of the present disclosure.

Referring to FIG. 4 and FIG. 5, the connector assembly 400 may include, but is not limited to, a base component 402 and a handle component 404 adapted to be partially disposed in the base component 402 through a first opening 602 (shown in FIG. 6). In an embodiment, the base component 402 and the handle component 404 can interchangeably be referred to as the lock bolt 402 and the wedge 404, respectively, without departing from the scope of the present disclosure.

The base component 402 may include, but is not limited to, an arm 408, the first opening 602 formed on the arm 408, and a locking portion 406 formed at an end of the arm 408. The locking portion 406 may be adapted to removably inserted in a second opening 502 formed by alignment of respective slots 204 of the pair of panels 200. In an embodiment, a profile of the locking portion 406 is triangular. Therefore, the profile of the locking portion 406 may vary based on constructional and operational parameters of the panels to be connected, without departing from the scope of the present disclosure. Further, the second opening 502 is formed by alignment of the respective slots 204 of the pair of formwork panels 200, when the pair of formwork panels 200 is positioned adjacent to each other.

In an embodiment, the handle component 404 may be adapted to be 25 disposed through the first opening 602 in the base component 402. The handle component 404 may be adapted to be operated to rotate the arm 408 such that the locking portion 406 is rotated within the second opening 502 to partially lock the base component 402 in the second opening 502 for securing the partially aligned position of the pair of formwork panels 200.

As illustrated in FIG. 5, the locking portion 406 may have triangular profile. The lock portion 406 may be inserted in the second opening 502, and then the handle component 404 may be operated to rotate the base component 402 while being inside the second opening 502. Consequently, the connector assembly 400 may be partially locked resulting into coupling of both the panels 200. In an embodiment, when the profile of the locking portion 406 is triangular, the locking portion 406 may maintain a three-point contact with the pair of panels 200 in a locked state. In an embodiment, when the profile of the locking portion 406 is rectangular, the locking portion 406 may maintain a four-point contact with the pair of panels 200 in a locked state.

Once the connector assembly 400 is partially locked, the handle component 404 may be adapted to be pushed downwards through the first opening 602 such that the handle component 404 comes in contact with a panel joint 604 formed by the pair of panels 200. In particular, the handle component 404 may include a stopper 504, which may come in contact with the panel joint 604, when the handle component 404 is pushed downwards. Further, the handle component 404 may be pushed such that the stopper 504 as well as an end 506 of the handle component 404 may come in contact with the panel joint 604. Due to this, the handle component 404 provides two-face support in order to prevent any unwanted rotation. Owing to the contact of the handle component 404 with the panel joint 604, the connector assembly 400 is completely locked with the pair of panels 200.

In an embodiment, the handle component 404 comes in contact with the panel joint 604 by virtue of a profile of a portion of the handle component 404 sliding within the first opening 602 of the base component 402.

Figure 6C:
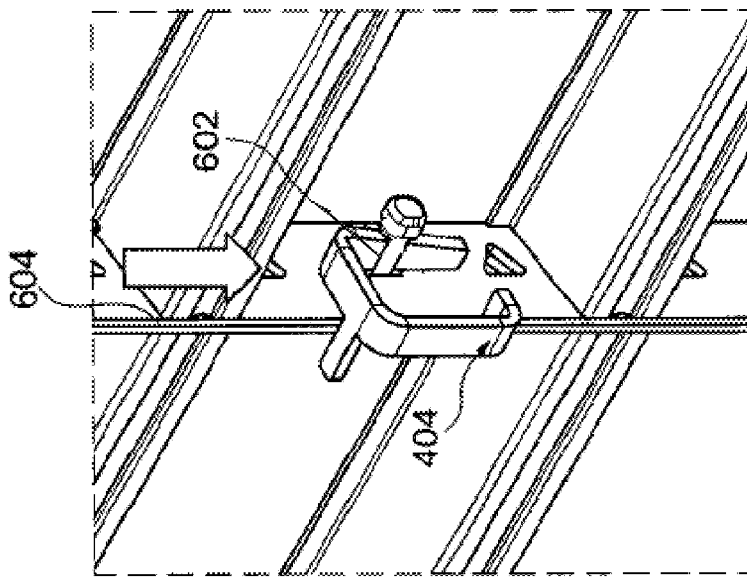
FIGS. 6A, 6B, and 6C illustrate mounting of the connector assembly for connecting the pair of formwork panels, according to an embodiment of the present disclosure.
Figure 6B:
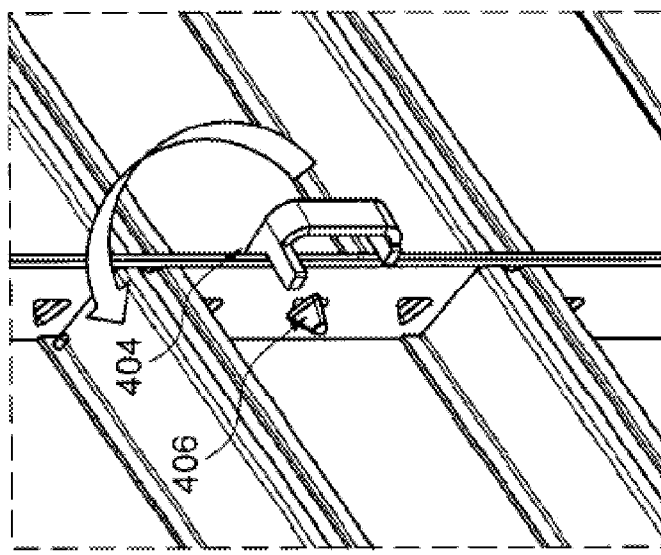
Figure 6A:
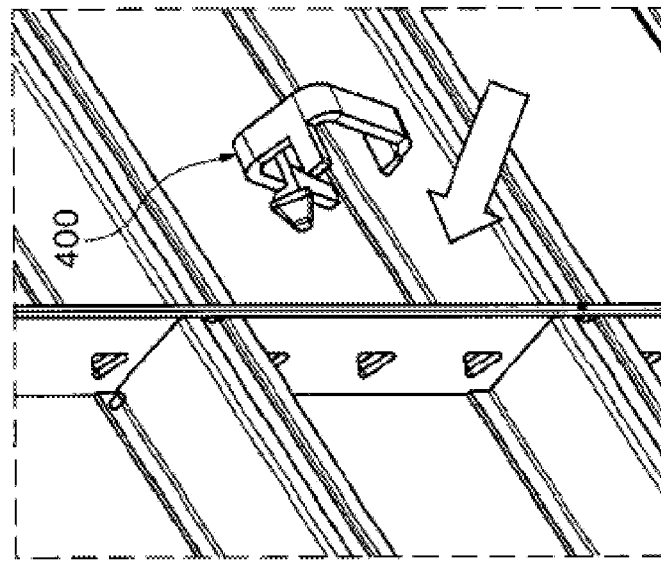

FIG. 6A, FIG. 6B, and FIG. 6C illustrate mounting of the connector assembly 400 for connecting the pair of panels 200, according to an embodiment of the present disclosure. In particular, FIG. 6A illustrates insertion of the locking portion 406 in the second opening 502 formed by the panels 200, according to an embodiment of the present disclosure. FIG. 6B illustrates operating the handle component 404 to rotate the locking portion 406 while being within the second opening 506 for locking. Further, FIG. 6C illustrates pushing the handle component 404 in a downward direction sliding through the first opening 602 of the base component 402, according to an embodiment of the present disclosure. The profile of the portion of the handle component 404 sliding through the first opening 602 is such that when the handle component 404 is pushed downwards, the handle component 404 would come in contact with a panel joint 604 of the panels 200 resulting into restricting the movement of the connector assembly 400.

Figure 7A:
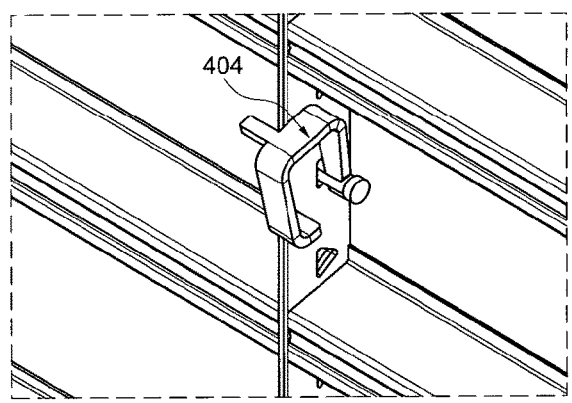
FIGS. 7A and 7B illustrate mounting of the connector assembly for connecting the pair of formwork panels, according to an embodiment of the present disclosure.
Figure 7B:
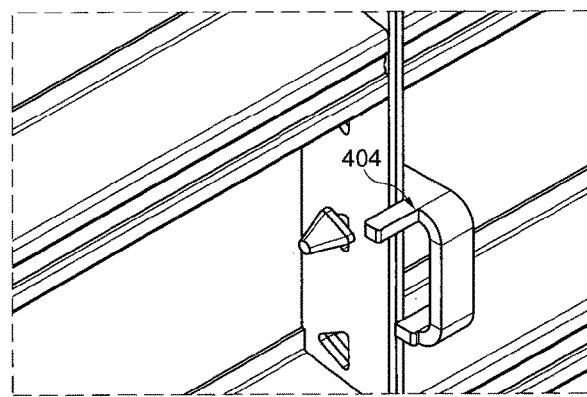

FIG. 7A and FIG. 7B illustrate mounting of the connector assembly 400 for connecting the pair of panels 200, according to an embodiment of the present disclosure. For the sake of brevity, constructional and operational features of the present disclosure that are already explained in the description of previous figures are not explained in the description of FIG. 7A and FIG. 7B.

As would be gathered, the panel 200 and the connector assembly 400 of the present disclosure offer a comprehensive approach for construction of the structures, such as walls and columns. Firstly, owing to the use of high-grade steel for the frame 100 and corresponding supporting stiffeners, the panels 200 so formed are robust. Further, the form-lining or the flat portion 202 of the panel 200 ensures best form finish of the structure formed.

Considering the convenience of assembling and disassembling the panels 200, time taken for forming the structure is also significantly reduced. In addition, the panel 200 can be connected to other panels 200 in any alignment. This would ensure flexibility in terms of applications of the panels 200. Moreover, the connector assembly 400 has less number of components and is therefore, cost-effective as well. Therefore, the panel 200 and the connector assembly 400 of the present disclosure are safe, risk-free, flexible in implementation, cost-effective, convenient, and have a wide range of applications.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A connector assembly for connecting a pair of formwork panels with each other, the connector assembly comprising:
    a base component comprising:
        an arm;
        a first opening formed on the arm; and
        a locking portion formed at an end of the arm and adapted to be removably inserted in a second opening formed by alignment of respective slots of the pair of formwork panels; and
    a handle component adapted to be partially disposed in the base component through the first opening formed on the arm, wherein the handle component is adapted to be operated to rotate the arm such that the locking portion is rotated within the second opening to partially lock the base component in the second opening for connecting the pair of formwork panels, wherein the handle component comprises a stopper adapted to come in contact with a panel joint, when the handle component is pushed downwards, and wherein when the handle component is pushed downwards, the stopper and an end of the handle component are adapted to come in contact with the panel joint to provide two-face support to the connector assembly,
    wherein the end of the handle component comprises an extended portion extending along a direction of the arm, and wherein the extended portion extends in a leftward direction towards the stopper, and
    wherein the stopper and the extended portion are horizontally opposite to each other in a locked state.

2. The connector assembly of claim 1, wherein the handle component is adapted to be pushed downwards through the first opening such that the handle component comes in contact with the panel joint formed by the pair of formwork panels to completely lock the connector assembly with the pair of formwork panels.

3. The connector assembly of claim 2, wherein the handle component comes in contact with the panel joint by virtue of a profile of a portion of the handle component sliding within the first opening of the base component.

4. The connector assembly of claim 1, wherein a profile of the locking portion is triangular such that the locking portion has a three-point contact with the pair of formwork panels in the locked state.

5. The connector assembly of claim 1, wherein the second opening is formed by alignment of respective slots of the pair of formwork panels, when the pair of formwork panels are positioned adjacent to each other.

* * * * *